R. P. JACKSON.
VIBRATING RECTIFIER.
APPLICATION FILED MAY 25, 1914.

1,298,727.

Patented Apr. 1, 1919.

WITNESSES:
Fred H. Miller
D. C. Davis

INVENTOR
Ray P. Jackson
BY
Wesley G. Carr
ATTORNEY

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

VIBRATING RECTIFIER.

1,298,727.      Specification of Letters Patent.      Patented Apr. 1, 1919.

Application filed May 25, 1914. Serial No. 840,724.

*To all whom it may concern:*

Be it known that I, RAY P. JACKSON, a citizen of the United States, and a resident of Edgewood Park, in the county of Allegheny and State of Pennsylvania, have invented a new and useful Improvement in Vibrating Rectifiers, of which the following is a specification.

My invention relates to apparatus for transforming alternating currents into direct currents, and specifically to rectifying apparatus of the vibrating-armature type.

The purpose of my invention is to devise an apparatus of the character specified that will be compact and rugged in construction, and have few moving parts, and that also will need no permanent uni-directional exciting current and will be free from sparking at the contacts, under all load conditions.

Figure 1:
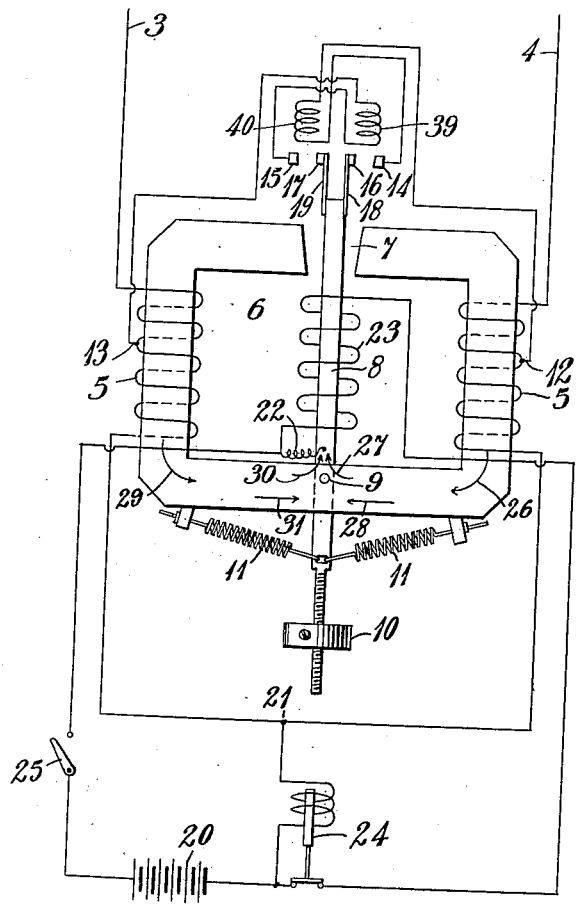
Figure 2:
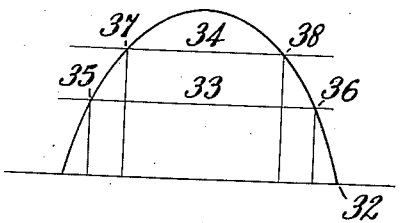

Referring to the accompanying drawing, Figure 1 is a diagrammatic view of my rectifier, and Fig. 2 is a wave diagram illustrating the operation thereof.

The mains 3 and 4 of a single-phase alternating current supply circuit are connected to the terminals of the winding 5—5 of an auto-transformer 6 having an air gap 7 in its magnetic circuit. A vibratory member 8, of magnetizable material, is pivotally mounted at 9 on the core of the auto-transformer 6 and has its upper end disposed within the air gap 7. The center of oscillation and the inertia of the member 8, with respect to the pivot 9, may be adjusted by a movable counterweight 10, and the amplitude of vibration may be adjusted by springs 11—11.

Since a rectifier of the vibrating-armature type is generally used to give a comparatively low direct-current voltage for battery charging, I connect the secondary or rectifier circuit terminals of the auto-transformer at intermediate points 12 and 13 on the winding 5—5. The point 12 is connected to a fixed contact member 14, and the point 13 is connected to a fixed contact member 15. Two movable contact members 16 and 17 are resiliently mounted, by means of springs 18 and 19, on the upper end of the member 8, and are adapted to make contact, respectively, with the fixed contact members 14 and 15. All the contact members are preferably constructed from a refractory substance such, for example, as carbon, platinum or molybdenum. A load, such, for example, as a battery 20 is connected between the mid point 21 of the winding of the auto-transformer and the member 8, the latter connection being made by means of a flexible conductor 22. A fixed winding 23 is mounted to surround the member 8, although it is not carried thereby, and is connected across the terminals of the battery 20. Suitable means are provided for automatically opening the circuit of the winding 23 upon the flow of rectified current, such, for example, as an electromagnetic switch 24. The battery 20 may be inserted into or removed from, the circuit by means of a switch 25.

Having thus described the construction of my rectifier, the operation is as follows: Upon closing the switch 25 and supplying alternating current to the mains 3 and 4, an alternating magnetic flux will be set up in the core of the auto-transformer 6, and a uni-directional magnetic flux will be set up in the member 8, the latter being due to the flow of current from the battery 20 through the winding 23. The interaction between the two magnetic fluxes will result in the vibration of the member 8 in synchronism with the frequency of the alternating current source. As a result of this vibration, contact will be made and broken between the contact members 14—15 and 16—17, respectively, in such manner that the alternating current generated in the secondary winding of the auto-transformer will be rectified and flow through the wire 22 to the battery and thence to the neutral point 21 of the auto-transformer winding in a well known manner. As a result of this current flow, the electro magnetic switch 24 will be operated, and the direct current flow in the winding 23 will cease, but a uni-directional flux will continue in the member 8, as will be understood from the following explanation. When the contact member 16 is in engagement with the contact member 14, current will flow from the terminal 12 of the secondary winding to the contact member 14, thence to the contact member 16, member 8, wire 22, battery 20, and point 21, and thence back to the point 12 through the right hand half of the secondary winding. The result of this current flow will be to set up a magnetic flux in the core of the auto-transformer in the direction indicated by an arrow 26. This magnetic flux will divide near the pivotal point 9, a portion of it flowing through member 8, as indicated by an arrow 27, and a portion flowing around through the entire core of the auto-transformer, as indicated by an arrow 28. A very considerable portion of this flux will follow the path indicated by the arrow 27 because of the fact that, at this time, the member 8 is at the right hand limit of its path of movement and in close proximity to the right hand pole piece of the air gap 7, and also because of the relative shortness of this magnetic circuit whereas, in the magnetic circuit of the auto-transformer there is present a large air gap at 7. A half cycle later, in a similar manner, current will be flowing in the left hand half of the secondary winding and will set up a flux indicated by an arrow 29. This flux will divide near the point 9 into a portion indicated by an arrow 30 and another portion indicated by an arrow 31. It will be observed that the arrows 27 and 30 point in the same direction, and a unidirectional flux will flow in the member 8 as long as the device continues to rectify.

If a break between the contact members 14 and 16 or between contact members 15 and 17 does not come at the point of zero current flow, indicated by a point 32 on the alternating current wave shown in Fig. 2, sparking will occur. This condition is sometimes encountered because the member 8 does not vibrate in synchronism with the frequency of the alternating current supply, which is the same as the frequency of the secondary winding. The defect may be removed by adjusting weight 10 until the natural period of vibration of the member 8 approximates the desired rate of vibration. When charging a storage battery, the back electromotive force of the battery, at the beginning of charge, may be represented by an abscissa 33 in Fig. 2, and the back electromotive force, at the end of the charge, by an abscissa 34. The most desirable points of make and break for zero sparking, at the commencement of charge, are at 35 and 36, respectively, when the electromotive force of the rectified current and of the battery are equal and opposite. The most desirable points for make and break, at the end of charge are, in a similar manner, 37 and 38, respectively. It will be observed that point 37 is later on the wave than point 35 and that point 38 is earlier on the wave than point 36. My rectifier automatically provides for this change in the time of make and break because of the fact that the unidirectional flux in the member 8 is variable, being comparatively intense at the start of charge, owing to the heavy current flow in the rectifier circuit, and comparatively weak at end of charge, owing to the small current flow at that time. The force tending to vibrate the member 8 will vary directly with the intensity of the unidirectional magnetic flux therein, and, as a result, the strong force vibrating the member 8 at the commencement of charge will overcome its inertia quickly, throwing it very rapidly over from its right hand position to its left hand position, for example, bringing about the early point of make 35 and bending the spring member 19 to a marked degree holding the contact members 16 and 17 together for a considerable period and not allowing them to separate until the point 36 in the alternating wave is reached. In a similar manner, the comparatively feeble force tending to vibrate the member 8, at the end of charge, will cause a late make 37 and an early break 38.

While I have found these means unusually effective for preventing sparking at the contact members, it frequently happens that, owing to variations in the wave form or to alterations in the frequency of the supply current, there will be a tendency to spark at the contact members. I greatly mitigate the harmful effects of such sparks by inserting blow-out coils 39 and 40 in the connections to the fixed contact members 14 and 15, respectively. If an arc tends to hold over between the contact members 14 and 16 when the member 8 moves to the left, the closing of contact between the contact members 15 and 17 will permit a heavy current flow in the magnet blow-out coil 39 to effectively extinguish the harmful arc, as shown in Swiss Patent No. 42398.

If it is desired to rectify the full voltage of the alternating current supply, the fixed contact members 14 and 15 may be connected directly to the supply mains or they may be connected to any other source of alternating current having the same frequency as the mains 3 and 4. These are obvious changes and would not in any way alter the spirit of my invention.

If desired, the rectifier may be started by moving the member 8 by hand, the winding 23 and the cut-out device 24 being entirely done away with.

Having thus described my invention, what I claim is:

1. In a vibratory rectifier, an auto-transformer comprising a core member provided with a winding, a portion of the primary and secondary sections of said winding being spaced away from the remainder of said primary and secondary sections, rectifying contact members arranged to alternately close a circuit through each portion of said secondary section, whereby the magnetic flux traversing each portion of the auto-transformer winding periodically exceeds that traversing the other portion thereof and a pivotally mounted member of magnetic material arranged in proximity to said core member so as to be traversed by the difference in the magnetic flux traversing the two winding sections, said member being caused to vibrate by the interaction between the flux therein and the alternating flux in said core member and in turn, causing the relative movement of said rectifying contact members.

2. In a vibratory rectifier, the combination with a winding connected across the terminals of a source of alternating current and in inductive relation to a nearly closed magnetizable core, of a pivotally mounted member of magnetizable material, one portion of which is free to be vibrated in the gap in the magnetizable core and another portion of which is in proximity to another portion of the magnetizable core, said winding being symmetrically disposed on said core with respect to said pivoted member, two fixed contact members, contact members carried by the pivotally mounted member and arranged to be oscillated between said two fixed contact members, a connection from said source of alternating current to one of said fixed contact members, a connection from the other terminal of the source of alternating current to the other fixed terminal, and a connection from the movable contact members to an intermediate point of the source of alternating current.

3. In a vibratory rectifier, the combination with an auto-transformer having the primary section of its winding connected across a source of alternating current and having a core member embodying an air gap, of a pivotally mounted member of magnetizable material, one portion of which is free to be oscillated in said air gap and another portion of which is in proximity to another portion of the core member of the auto-transformer, the windings of said auto-transformer being substantially symmetrically disposed on said core member with respect to said pivoted member, contact members carried by the pivotally mounted member and arranged to be oscillated between two fixed contact members, a connection from one terminal of the secondary section of the winding of the auto-transformer to one of said fixed contact members, a connection from the other terminal of the secondary section of the winding to the other fixed contact member, and a connection from the movable contact members to substantially the mid-point of the transformer winding.

4. In a vibratory rectifier, the combination with an auto-transformer having the primary section of its winding connected across a source of alternating current and having a core member embodying an air gap, of a pivotally mounted member of magnetizable material, one portion of which is free to be oscillated in said air gap and another portion of which is in proximity to another portion of the magnetic circuit of the auto-transformer at substantially the mid-portion of the secondary section of the transformer winding, the windings of said auto-transformer being substantially symmetrically disposed on said core member with respect to said pivoted member, contact members carried by the pivotally mounted member and arranged to be oscillated between two fixed contact members, a connection from one terminal of the secondary section of the winding of the auto-transformer to one of said fixed contact members, a connection from the other terminal of the secondary section of the winding to the other fixed contact member, a connection from the movable contact members to a neutral point of the secondary winding section, and means for varying the natural period of vibration of the pivotally mounted member.

5. In a vibratory rectifier, the combination with an auto-transformer having the primary section of its winding connected across a source of alternating current and having a core member embodying an air gap, of a pivotally mounted member of magnetizable material, one portion of which is free to be oscillated in said air gap and another portion of which is in proximity to another portion of the magnetic circuit of the auto-transformer at substantially the mid-portions of both the primary and secondary sections of the transformer winding, the windings of said auto-transformer being substantially symmetrically disposed on said core member with respect to said pivoted member, contact members carried by the pivotally mounted member and arranged to be oscillated between two fixed contact members, a connection from one terminal of the secondary section of the winding of the auto-transformer to one of said fixed contact members, a connection from the other terminal of the secondary section of said winding to the other fixed contact member, a connection from the movable contact members to a neutral point of the secondary section of said winding, and means for varying the natural period of vibration of the pivotally mounted member by varying the location of its center of oscillation.

6. In a vibratory rectifier, the combination with an auto-transformer having the primary section of its winding connected across a source of alternating current and having a core member embodying an air gap, of a pivotally mounted member of magnetizable material, one portion of which is free to be oscillated in said air gap and another portion of which is in proximity to another portion of the magnetic circuit of the auto-transformer, substantially one-half the primary and one-half the secondary sections of the transformer winding being magnetically associated with each portion of the transformer core determined by said air gap and said point of proximity, contact members carried by the pivotally mounted member and arranged to be oscillated between two fixed contact members, a connection from one terminal of the secondary portion of the winding of the auto-transformer to one of said fixed contact members, a connection from the other terminal of the secondary portion of said winding to the other fixed contact member, a connection from the movable contact members to a neutral point of the secondary portion of said winding, and means comprising a spring control for controlling the amplitude of vibration of the pivotally mounted member.

7. In a vibratory rectifier, the combination with an auto-transformer having its primary winding connected across a source of alternating current and having a core member embodying an air gap, of a pivotally mounted member of magnetizable material, one portion of which is free to be oscillated in said air gap and other portion of which is in proximity to another portion of the magnetic circuit of the auto-transformer, substantially one-half the primary and one-half the secondary sections of the transformer winding being magnetically associated with each portion of the transformer core determined by said air gap and said point of proximity, contact members carried by the pivotally mounted member and arranged to be oscillated between two fixed contact members, a connection from one terminal of the secondary portion of the winding of the auto-transformer to one of said fixed contact members, a connection from the other terminal of the secondary portion of said winding to the other fixed contact member, a connection from the movable contact members to a neutral point of the secondary portion of said winding, means for varying the natural period of vibration of the pivotally mounted member by varying the location of its center of oscillation, and means comprising a spring control for controlling the amplitude of vibration of the pivotally mounted member.

8. In a vibratory rectifier, the combination with an auto-transformer having a core member and embodying an air gap, of a member of magnetizable material, one portion of which is free to be oscillated in said air gap, and another portion of which is pivoted upon the magnetizable core opposite the air gap, the windings of said auto-transformer being substantially symmetrically disposed on said core member with respect to said pivoted member, two fixed contact members, contact members carried by the pivotally mounted member and arranged to be vibrated between said two fixed contact members, a connection between one terminal of the secondary winding of the auto-transformer and one of the fixed contact members, a connection between the other terminal of the secondary winding and the other fixed contact member, a connection including a load circuit between the moving contact member and substantially the mid point of the secondary winding, adjustable springs for controlling the amplitude vibration of the moving member and an adjustable counterweight for controlling its natural period of vibration.

9. In a vibratory rectifier, the combination with an auto-transformer having an air gap in its magnetic circuit, of a member of magnetizable material, one portion of which is free to be oscillated in said air gap and another portion of which is pivoted upon the magnetizable core opposite the air gap, two fixed contact members, contact members carried by the pivotally mounted member and arranged to be vibrated between said fixed contact members, a connection between one terminal of the secondary winding of the auto-transformer and one of the fixed contact members, a connection between the other terminal of the secondary winding and the other terminal of the fixed contact member, a connection between the moving contact members and substantially the mid point of the secondary winding, adjustable springs for controlling the amplitude of vibration of the moving member, an adjustable counter-weight for controlling its natural period of vibration, means for generating a unidirectional magnetic field in the vibrating member, and means for deënergizing such exciting means when the device starts to deliver rectified current.

10. In a vibratory rectifier, the combination with a magnetic core, of means for producing an alternating magnetic flux therein, a movable member of magnetic material, means for energizing said movable member with unidirectional magnetic flux at starting, means for automatically stopping the action of said energizing means when normal operation is reached, and means for thereafter supplying said member with unidirectional magnetic flux by the rectification of a portion of said alternating flux.

11. In a vibratory rectifier, the combination with means for producing an alternating magnetic flux, of means for rectifying a portion of said flux and for causing said rectified flux, in conjunction with said alternating flux, to drive said rectifier.

12. In a vibratory rectifier, means for rectifying an alternating magnetic flux and for employing said rectified flux in driving said rectifier.

13. In a vibratory rectifier, means for producing a rectified magnetic flux which varies with the load by the rectification of an alternating flux and for employing said flux in driving said rectifier.

14. In a vibratory rectifier, means for producing a rectified magnetic flux which varies with the load by the rectification of an alternating flux and for employing said flux to modify the amplitude of vibration of said rectifier so as to substantially eliminate sparking.

15. In a vibratory rectifier, means for producing a rectified magnetic flux which varies with the load by the rectification of an alternating flux and for employing said flux in driving said rectifier with different amplitudes of vibration for different loads, so that substantially sparkless operation is effected.

In testimony whereof, I have hereunto subscribed my name this 18th day of May, 1914.

RAY P. JACKSON.

Witnesses:
R. W. E. MOORE,
B. B. HINES.